No. 815,074. PATENTED MAR. 13, 1906.
F. P. DE WILDE.
CIRCUIT BREAKING APPARATUS.
APPLICATION FILED NOV. 12, 1904.
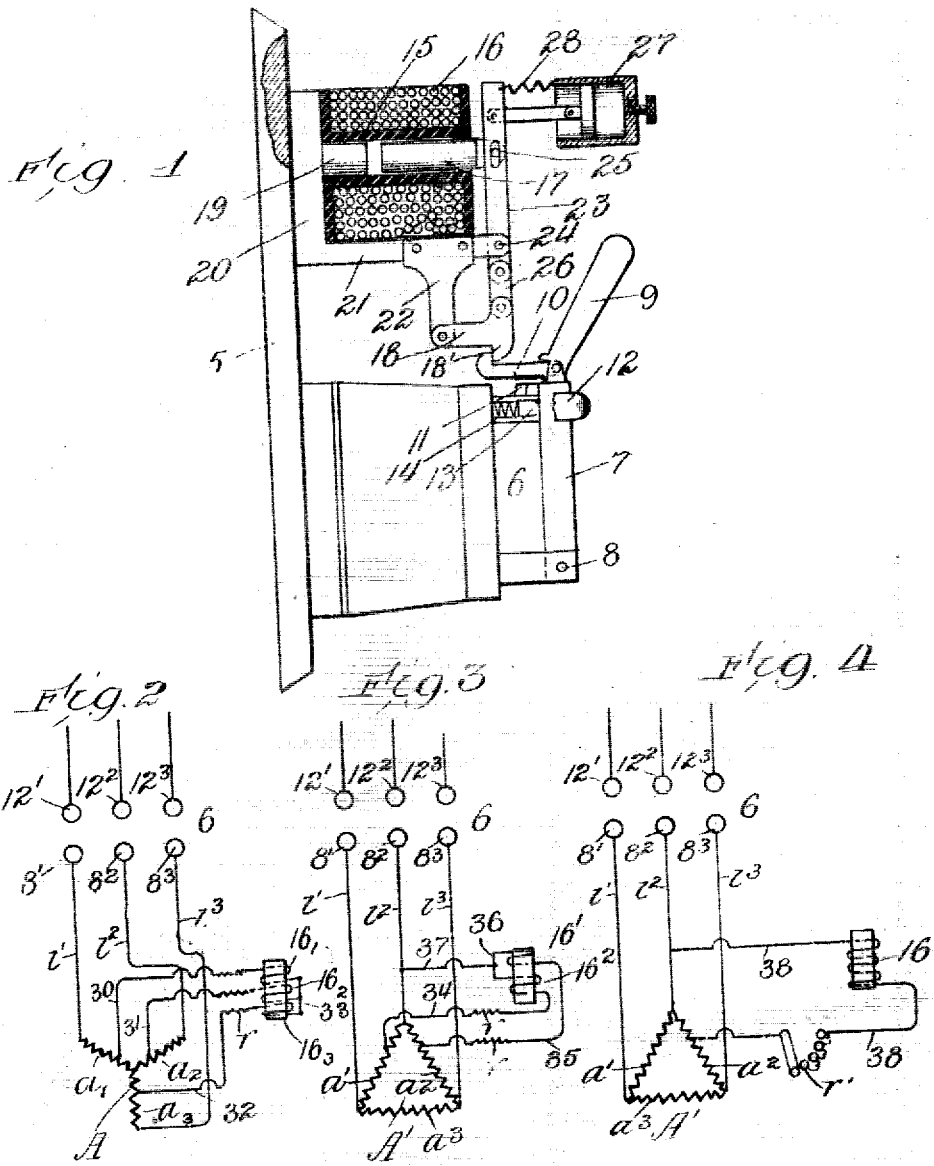

UNITED STATES PATENT OFFICE.

FREDERICK P. DE WILDE, OF CHICAGO, ILLINOIS.

CIRCUIT-BREAKING APPARATUS.

No. 815,074.

Specification of Letters Patent.

Patented March 13, 1906.

Application filed November 12, 1904. Serial No. 232,425.

*To all whom it may concern:*

Be it known that I, FREDERICK P. DE WILDE, of Chicago, in the county of Cook and State of Illinois, have invented certain new and useful Improvements in Circuit-Breaking Apparatus; and I hereby declare that the following is a full, clear, and exact description thereof, reference being had to the accompanying drawings, which form part of this specification.

My invention relates to circuit-breaking apparatus for dynamo-electric machines, and has for its primary object to provide a means novel in construction and advantageous in application for automatically cutting the dynamo-electric machine out of circuit upon the occurrence of predetermined conditions in the working circuit of such machine.

One of the useful applications of my invention is in the installation of induction-motors. It is a well-known characteristic of such a motor that at speeds below its normal rating its internal resistance or counter electromotive force drops with disproportionate rapidity and that at less than the normal speed its power factor is very low. As a result when one motor of a group supplied from a single generator lags by reason of an increase in the driven load or from other causes it begins to take more than the normal amount of current to maintain it at the slow speed, and the other motors of the group are accordingly robbed of part of their required current. Consequently the power factor of the system is thereby decreased until the generator is entirely unable to supply power necessary to operate the motors efficiently. Further, when at noontime or other periods of inactivity the generator is brought to a stop if a number of the motors are left in the circuit the generator on restarting is unable to supply sufficient current to the line to start the motors. It is advantageous, therefore, to provide automatic means for cutting out the motors upon the drop of the counter electromotive force below a definite limit and to prevent the motors from being cut in until the electromotive force of the generator is restored to or above said limit. Further, it is advantageous to automatically cut out and prevent the cutting in of the motor upon the rise of the potential in the line to some value predetermined as the maximum limit of safety. These and other desiderata are attained by the use of my invention, as will more fully appear from the following description and accompanying drawings, wherein—

Figure 1 is a side view with parts broken out of an electrical mechanical switch embodying features of my invention. Figs. 2, 3, and 4 are diagrammatic views illustrating the several suitable electrical connections of the device shown in Fig. 1.

Referring now to the several figures, wherein like characters of reference refer always to like parts, 5 indicates a suitable base, upon which is mounted a three-pole single-throw semi-automatic switch 6, which may be of any suitable construction, such that when the switch is released from restraint it automatically breaks the contact between its coacting contact parts. For convenience I have herein illustrated a switch as being of the ordinary knife-blade type, although it will be understood that any form of switch may be employed and that common practice of the day would direct the use of an oil-switch. In the specific construction shown by way of illustration, 7 indicates a movable member of the switch, pivoted, as at 8, and provided at its upper end with a hand 9 and also with a latch-stud 10, normally held in raised position, as by a spring 11.

12 indicates a stationary contact, with which is associated means for automatically throwing the blade out of contact when said blade is freed from restraint. Specifically, 13 indicates a stud seated in a suitable recess for engagement with the blade 7, and 14 indicates a spring tending constantly to force said stud in such direction as to throw the blade 7 out of contact with the part 12.

Associated with the switch are electromagnetically-operable devices for maintaining the movable switch-blade in closed position or releasing it for automatic breaking movement. Such means preferably comprise a solenoid 15, comprising one or more coils 16 in accordance with the specific application of the invention, as will hereinafter become more fully apparent; a core 17 for the solenoid, a latching member 18, having a hook 18' for coaction with the latching-stud 10 of the switch-blade; and a suitable operating connection between the solenoid and the latching member 18. Preferably the spool supporting the coil of the solenoid is arranged upon a stud 19, carried by a frame member 20, which bends forward beyond the spool, as at 21, and is provided with a projection 22, arranged to afford pivotal support for one end of the latching member 18.

23 indicates a lever, pivoted, as at 24, in the extremity of the frame extension 21, at one side of said pivot connected for movement with the solenoid-core 17, as by the slot-and-pin connection shown at 25, such that movement of the core in either direction produces a corresponding movement of the lever 23 about its pivot. On the opposite side of the pivot 24 the lever 23 has a toggle connection with the latch member 18 through a link 26, pivoted at one end to the lever 23 and at the other end to the latching member 18. The solenoid is so arranged that when the lever 23 is in mid-position, so that the link 26 is practically in alinement therewith, the latching member 18 is in position for engagement with the coacting latch part 10 of the switch. When said lever 23 is moved sufficiently in either direction by the corresponding movement of the core 17 of the solenoid, the link 26 is drawn up and the latching member 18 is lifted out of engagement with the stud 10 to release the switch for automatic movement to open position, as before described. I prefer that in the construction described the parts 19, 20, and 23 be all of magnetic metal like the core 17, the latter being preferably laminated, so that together with said core said parts form an almost closed magnetic circuit, open only in the gap between the stud 19 and the core 17. If it be desired to retard the movement of the core 17 in either direction or in both directions, so that slight and temporary fluctuations in the current will not actuate the switch-releasing means, a dash-pot 27 of suitable construction, such as will be apparent to those skilled in the art, is provided to effect such result. A spring 28 or equivalent means is preferably provided for positively moving the lever 23 outward when the solenoid is deenergized.

It will be apparent now that when the coil 16 is deënergized the spring 28 moves the lever 23 to position to raise the hook 18' of the latch member 18 out of engagement with the coacting latch member 10 of the switch and that when the current-flow through the solenoid-coils draws the core 17 a predetermined distance into the solenoid a like result will follow; but while the core 17 is maintained between certain critical limits in substantially the position illustrated in the drawings the latch member 18 is maintained in position to engage the coacting latching-stud 10 of the switch.

In the diagrammatic views I have shown several feasible methods of connecting the device with induction-motors, all of said connections being characterized by the fact that the solenoid winding or windings are included in a shunt-circuit or potential tap tapping one or more of the generating-coils of the motor, so that the current-flow through the solenoid-coils is dependent upon the action of the motor. Referring now to Fig. 2, A indicates diagrammatically the armature or stator of an induction-motor of the star-connected type having the coils $a'$ $a^2$ $a^3$ connected together at a common point and at their other terminals connected, respectively, to the main wires $l'$, $l^2$, and $l^3$. The switch 6 has its several posts 8', 8², and 8³ and its stationary contacts 12', 12², and 12³ connected directly in the line-wires aforesaid. From one or more of the coils $a'$, $a^2$, and $a^3$ are taken taps, connected at such points as to show under normal working conditions a predetermined difference of potential, low enough to be suitable for the operation of an electromagnetic device, such as the solenoid 15. Referring specifically to Fig. 2, 30, 31, and 32 indicate taps taken at equal distances from the common point of the coils $a'$, $a^2$, and $a^3$ of the armature and each including therein certain windings of the coil 16 of the solenoid 15, such windings being indicated as 16', 16², and 16³, and said wires 30, 31, and 32 being connected together, as by a wire 33. It will be apparent that the taps may be so arranged that any predetermined difference of potential may be declared between the terminals of the tap and the current-flow therethrough under normal conditions accurately predetermined and so that under normal working conditions the windings of the solenoids are energized to such an extent that they hold the core 17 in a position substantially corresponding to that shown in Fig. 1, whereby the latching member 18 is maintained in position for engagement with the coacting latching-stud of the switch. While for star-connected motors I prefer that taps from all of the coils $a'$ $a^2$ $a^3$ be taken in the manner illustrated in Fig. 2, it will be apparent that a single tap might be taken to energize the solenoid-coil. Referring now to Figs. 3 and 4, it will be seen that my invention is in like manner applicable to a delta-wound motor, although in such cases the maximum number of taps which can be taken is obviously two where it is desired to maintain the current-flow through the solenoid-winding at a relatively low potential. Specifically, in Fig. 3, A' indicates diagrammatically a delta-wound armature having the coils $a'$, $a^2$, and $a^3$ connected together in series and at their points of connection to the three line-wires 1', 1², and 1³, wherein are connected, as before described, the several blades of the switch. The two potential taps 34 and 35 are here taken from the two adjacent windings $a'$ $a^2$ and include the two solenoid-coils 16' 16², said windings being connected together, as at 36, and preferably connected in common, as by a wire 37, with the line-wire 1² intermediate the point from which the taps are taken. This connection 37 is, however, not essential, but is desirable, for the reason that it raises the voltage in each coil 16' 16² to a certain extent. In Fig. 4 I have shown a single tap 38, including the entire coil 16 and connected to the line 1². In each instance the resistance of the shunt or tap circuit must obviously be properly proportioned to prevent too great current-flow therethrough, and for this purpose resistances r, which may be either inductive or non-inductive, may be included in the tap-circuits, as shown in Figs. 2 and 3, or a variable resistance, such as that shown at r' in Fig. 4, may be employed. It will be apparent that by this system of potential taps, including the coils of an electromagnetic switch-controller, I provide a means for securing a current of low potential to be utilized in actuating the switch-controller, and this I believe to be new.

The resistance of the solenoid-coil should be relatively high with reference to that portion of the armature-winding which it bridges, and it is therefore evident that current of correspondingly small value will initially pass through said coil as a result of the difference of the respective ohmic resistance of the said two branches of the circuit. If now counter electromotive force, which has a function analogous to resistance, be developed in the armature-circuit branch spanned or bridged by said coil, then the value of the current which will flow through said coil, and therefore the coil's strength, will be thereby proportionately increased. The increase of the counter electromotive force in the armature branch of the parallel circuit is a means for substantially increasing the resistance of that branch of the parallel circuit, and thereby causing increased current to flow through the coil branch of said circuit, and conversely a decrease of counter electromotive force in the armature branch will substantially decrease the resistance thereof and cause less current to flow through the coil branch of said joint or parallel circuit. The strength of the magnet 15 is therefore substantially proportional to the counter electromotive force developed by the inductive element (the armature or stator) of the motor. In the illustration there are two parallel branches, one of constant and one of variable resistance. Therefore the current in the constant branch will at all times be proportional to the resistance in the variable branch.

The operation of my invention will now be apparent to those skilled in the art. As long as the speed of the motor is such as to maintain a definite counter electromotive force in the armature properly proportional to a consequent current-flow therethrough current of normal value will flow through the coils of the solenoid 15, and the core of said solenoid is thereby held in such position that the latch member 18 is maintained in proper position for engagement with the coacting stud of the movable switch-blade; but should the prime electromotive force become excessive, thereby increasing the speed of the motor and raising its counter electromotive force and increasing the flow through the electromagnetic device beyond a predetermined extent, the core 17 is drawn so far into the solenoid that the lever 23 is thereby tilted and through its toggle connection with the latch member 18 it raises said latch and releases the switch 6, which automatically breaks the circuit. In this way deleterious and abnormal increase of speed of the motor is automatically prevented. If, on the other hand, from any cause the motor lags or slows down, its counter electromotive force is disproportionately lowered and the current-flow through the solenoid is reduced, so that the tension of the spring 28 or any equivalent actuating force operates to withdraw the solenoid-core 17 to such an extent as to tilt the lever 23 in the opposite direction sufficiently to withdraw the latch member 18 from engagement with the coacting latch member of the switch and permit the switch to automatically open the motor-circuit. Further, it will be apparent that when the generator is stopped all the motors of the circuit will be promptly and automatically cut out of circuit and cannot be restored thereto until the generator is again started up and is producing electromotive force sufficient to cause the solenoid to become energized to maintain the latch member 18 in latching position.

While I have herein described in some detail an embodiment of my invention which I consider to be new and advantageous, I do not desire to be understood as limiting the application of my invention to devices such as herein shown and described further than as specified in the claims, for it will be apparent that the spirit of my invention is widely applicable and may apply to various forms of dynamo-electric machinery without departure from the scope of my invention.

Having thus described my invention, what I claim as new, and desire to secure by Letters Patent of the United States, is—

1. In combination with a dynamo-electric machine, having an element wherein its electromotive force is developed, and the circuit therefor, a switch included in said circuit, an electroresponsive apparatus for controlling said switch, and a potential tap from the winding of said generating element of the dynamo-electric machine subject to less than the entire potential of said element, and including the windings of said electroresponsive apparatus.

2. In combination with a dynamo-electric machine having an element wherein its counter electromotive force is developed, and the circuit therefor, an automatically-opening switch included in said circuit, means for maintaining the switch in closed position and electroresponsive apparatus controlling the operation of said means, and a potential tap from the winding of said element of the dynamo-electric machine subject to less than the entire potential of said element, and including the winding of said electroresponsive apparatus.

3. In combination with an induction-motor and the circuit therefor, an automatically-opening switch included in said circuit, means for maintaining said switch closed, electroresponsive apparatus controlling said means, and a potential tap from the generating element of the motor wherein counter electromotive force is developed subject to less than the entire potential of said element, and including the winding of the electroresponsive apparatus.

4. In combination with a dynamo-electric machine having an element wherein counter electromotive force is developed, and a circuit therefor, a circuit-breaking apparatus comprising an automatically-opening switch included in said circuit, means for maintaining said switch in closed position, and electroresponsive apparatus arranged to actuate said means to release the switch when the movable element of the electroresponsive apparatus is moved beyond a certain limit in either direction by increase or decrease beyond certain limits of the current-flow in the windings of said responsive apparatus, and a potential tap from the said generating element of the dynamo-electric machine subject to less than the entire potential of said element, and including therein a winding of the electroresponsive apparatus.

5. In combination with a semi-automatic switch, means for maintaining the switch against automatic movement, comprising a movable latch member, an electroresponsive device, and a toggle connection between the electroresponsive device and the latch member operable to release the switch upon the actuation of the electroresponsive device by variation of its energization above or below normal limits.

6. In combination with a semi-automatic switch, means for maintaining the switch against movement comprising a movable latch, an electromagnetic coil, a movable magnetically-responsive member associated with said coil for movement thereby in one direction, means for moving said member in the opposite direction, and a toggle between the said member and the latch arranged to maintain the latch in position to prevent movement of the switch when the said member is positioned within certain limits, and to move the latch to switch-releasing position when said member is moved without said limits in either direction.

In testimony that I claim the foregoing as my own I affix my signature in presence of two witnesses.

FREDERICK P. DE WILDE.

In presence of—
 GEO. T. MAY, Jr.,
 MARY F. ALLEN.